United States Patent
Doherty

(10) Patent No.: US 6,579,350 B2
(45) Date of Patent: Jun. 17, 2003

(54) AIR LAID/WET LAID GAS FILTRATION MEDIA

(75) Inventor: Joseph P. Doherty, Kingston, NH (US)

(73) Assignee: Lydall, Inc., Manchester, CT (US)

( * ) Notice: Subject to any disclaimer, the term of this patent is extended or adjusted under 35 U.S.C. 154(b) by 0 days.

(21) Appl. No.: 09/987,158

(22) Filed: Nov. 13, 2001

(65) Prior Publication Data

US 2002/0083837 A1 Jul. 4, 2002

Related U.S. Application Data

(60) Provisional application No. 60/247,924, filed on Nov. 14, 2000.

(51) Int. Cl.$^7$ ................................................. B03C 3/28
(52) U.S. Cl. .............................. 96/67; 55/488; 55/497; 55/521; 55/524; 55/DIG. 5; 55/DIG. 39; 96/69
(58) Field of Search ............................... 96/15, 17, 66, 96/67, 69; 55/521, 488, 524, 497, 528, 486, DIG. 5, DIG. 39; 95/57, 59; 442/402–408, 412, 413

(56) References Cited

U.S. PATENT DOCUMENTS

| | | | | |
|---|---|---|---|---|
| 3,307,332 A | * | 3/1967 | Grace et al. ................... 96/17 |
| 4,917,942 A | * | 4/1990 | Winters ........................ 96/99 |
| 5,240,479 A | * | 8/1993 | Bachinski ..................... 96/17 |
| 5,246,772 A | | 9/1993 | Manning ..................... 428/284 |
| 5,419,953 A | * | 5/1995 | Chapman ..................... 442/35 |
| 5,597,645 A | * | 1/1997 | Pike et al. .................... 96/99 |
| 5,645,057 A | * | 7/1997 | Watt et al. ............. 128/206.12 |
| 5,647,881 A | * | 7/1997 | Zhang et al. ................. 55/382 |
| 5,672,399 A | | 9/1997 | Kahlbaugh et al. ............ 55/527 |
| 5,709,735 A | * | 1/1998 | Midkiff et al. ................. 96/17 |
| 5,792,242 A | * | 8/1998 | Haskett ........................ 96/68 |
| 5,800,586 A | | 9/1998 | Cusick et al. ................ 55/486 |
| 5,955,174 A | | 9/1999 | Wadsworth et al. ........ 428/181 |
| 5,993,501 A | | 11/1999 | Cusick et al. ................. 55/486 |
| 6,123,752 A | | 9/2000 | Wu et al. ....................... 96/69 |
| 6,171,369 B1 | * | 1/2001 | Schultink et al. .............. 95/57 |
| 6,183,536 B1 | * | 2/2001 | Schultink et al. .............. 95/57 |
| 6,261,979 B1 | | 7/2001 | Tanaka et al. ............ 55/521 X |
| 6,267,252 B1 | | 7/2001 | Amsler ..................... 55/527 X |
| 6,322,615 B1 | * | 11/2001 | Chapman ....................... 96/67 |
| 6,372,004 B1 | | 4/2002 | Schultink et al. .............. 96/66 |
| 6,428,610 B1 | * | 8/2002 | Tsai et al. ...................... 96/15 |

FOREIGN PATENT DOCUMENTS

| | | |
|---|---|---|
| JP | 6217118 A | 8/1987 |
| WO | WO 97/23267 | 7/1997 |
| WO | WO 97/30771 | 8/1997 |
| WO | WO 01/32292 A1 | 5/2001 |

* cited by examiner

*Primary Examiner*—Richard L. Chiesa
(74) *Attorney, Agent, or Firm*—Birch, Stewart, Kolasch & Birch, LLP

(57) ABSTRACT

A pleatable high efficiency non-woven, gas filtration media is provided. The media has an electrically charged air laid fibrous layer with a thickness between about 2 and about 35 mils, and a wet laid fibrous layer having a thickness of between about 5 and about 35 mils. The combined layers have, (a) a thickness of between about 10 and about 50 mils, (b) a stiffness of between about 200 and about 3500 mgs, (c) a Frazier of between about 10 and about 400 CFM, and (d) an $\alpha$ of at least 15.

22 Claims, 3 Drawing Sheets

AIR LAID/WET LAID GAS FILTRATION MEDIA

This application claims priority on provisional Application No. 60/247,924 filed on Nov. 14, 2000, the entire contents of which are hereby incorporated by reference.

FIELD OF THE INVENTION

This invention relates to gas filtration media and especially air filtration media. More particularly, this invention relates to a high efficiency non-woven gas filtration media made by combining two or more different layers into a unitary structure in such a way that the resultant media exhibits improved filtration performance and the media can be pleated.

BACKGROUND OF THE INVENTION

Filtration media has been developed that will remove particles smaller than 10 microns from gas streams, e.g. air. Filters employing such media are commonly referred to as HEPA (High Efficiency Particulate Air), ULPA (Ultra High Efficiency Particulate Air), and ASHRAE (American Society for Heating, Refrigeration and Air Conditioning Engineers—Standard 52.2) filters.

It is often desirable in high efficiency filters to pleat the filter media. The pleated media is placed in a filter frame to form a completed filter. In such case, the filter media surface area is substantially greater than the planar area of the filter frame. For example, U.S. Pat. No. 5,993,501 discloses composite filter media, suitable for pleating, in which a fibrous filtration layer, preferably made of air laid glass fibers, is supported with a non-woven air laid scrim.

Today, the usual standard high efficiency filter media is that of glass fibers with binders, optionally combined with cellulosic fibers. The media is made by a wet laid process. More specifically, high efficiency filtration media has been made of borosilicate glass microfibers bound together by acrylic resin and produced by a wet laid papermaking process. This provides media that exhibits good filtration performance while exhibiting the physical characteristics required for constructing a pleated media pack for assembly into a rigid filter frame.

More recently, developments in synthetic (polypropylene, polyester, etc.) fibers have provided fibers that can be used in combination with or in place of borosilicate glass and cellulose fibers. It is well known that the efficiency of filtration of small particles e.g. 10 microns or less, is greatly increased by the use of, at least in part, electrically charged fibers in the filtration media. For instance, U.S. Pat. No. 5,955,174 describes electrically charged fibrous filtration media. Composites of a charged layer and a layer of carded fibers or spunbonded fibers are thermally bonded, or adhered, or hydroentangled, or needle-punched to the electrically charged layer.

While electrically charged layer, as noted above, produce increased efficiencies for filtering small particles, these filters also have some substantial disadvantages. First, electrically charged filtration media is typically an air laid media, since subsequent charging of the media must be in connection with a very dry and electrically insulating material. Hence, typically, the electrically charged filtration media is a polyolefin meltblown or spunbonded filtration media.

Air laid filtration media by the nature of the process is not structurally very strong. In addition, as explained in more detail below, the air laid media is not sufficiently stiff to adequately pleat. In some cases, pleats will not be retained in the pleated configuration during usual handling and, in other cases, the desired pleated configuration cannot be maintained during use, since the pressure drop of gas passing through the media causes a collapse of the pleats and an inward folding of the pleats against each other. Therefore, typically, the electrically charged, air laid filtration media is attached to a stronger support, which can be a carded web, a scrim, a spun bonded, a spun lace, layers of meltblown, netting, metal mesh and the like. However, if these supports are too thick or too stiff, it is difficult or impossible to adequately form the filter media into a pleated configuration. Usually, from about 3 to 8 pleats per inch(per 2.54 cm) are desired, but up to 10 to 12 pleats can be used. If the media is too thick, that number of pleats can not be obtained without one pleat folding against another pleat. If the media is too stiff, the media can not be so pleated without breaking, cracking or disrupting the media, especially with angular pleats.

In addition, there are several post treatment methods which can be used to adjust the properties of the air laid media. These include, but are not limited to, calandering, thermal bonding, and binders. However, these post treatments increase the cost and can substantially lower the filtration performance.

In addition, since an air laid filtration media is usually relatively thin, it is often necessary to construct the media using multiple layers of the media, e.g. 3–6 layers, so as to provide acceptable filtration efficiencies, especially when the filter is intended to be a HEPA or ULPA or ASHRAE filter. This, in combination with a support makes the filter media dificult to adequately pleat because of its thickness.

Further, the supports of usual prior art media which are suitable for pleating provide little additional filtration and are, therefore, a substantial additional expense and weight without a substantial compensating effect on filtration performance.

It would, therefore, be of substantial advantage to the art to provide a pleatable, electrically charged filtration media which can easily meet HEPA, ULPA and ASHRAE standards but which does not have the disadvantages described above in connection with conventional, pleatable filtration media with conventional supports. It would be a further advantage to the art to provide such filtration media with increased filtration performance as compared with conventional filtration media.

SUMMARY OF THE INVENTION

The present invention is based on several primary and subsidiary discoveries.

Firstly, as a primary discovery, it was found that a pleatable, high-efficiency, non-woven filtration media could be prepared by a combination of an electrically charged air laid fibrous layer and a wet laid fibrous layer. This was surprising in that the art had never considered that wet laid fibrous material could be a candidate for a support for pleated air laid media.

Secondly, as a primary discovery, it was found that, in order to make the electrically charged air laid fibrous layer and the wet laid fibrous layer into a combined filter media which could be pleated, the thicknesses of the two layers must be within certain ranges and the thickness of the combined layers must also be within certain ranges.

As a subsidiary discovery, it was found that, with such air laid and wet laid layers of those certain thicknesses, the two layers could be adequately combined by usual techniques, e.g., adhesives, spot-welding and the like, which would, nevertheless, allow the air laid/wet laid composite filtration media to be adequately pleated without delamination of the constituent layers.

As a third primary discovery, it was found that, in order to achieve such pleating of combined layers making up the filtration media, the stiffness of those combined layers must be between about 200 and 3500 mgs. It was found that with a stiffness of less than about 200 mgs, the filter media is simply not stiff enough to be formed into a retainable pleat. At stiffnesses above about 3500 mgs, no substantial improvement in pleatability was achieved and additional stiffness only increased costs.

As a fourth primary discovery, it was found that the combined layers must have a Frazier of between about 10 CFM(0.28 CMM) and about 400 CFM(11.33 CMM). At a Frazier of about below 10, the filter media exhibits too high a pressure drop for adequate performance of the filter and above about 400 CFM, the filter is too open to achieve high efficiency filtration.

As a fifth primary discovery, it was found that within the ranges noted above, it was possible to produce a filter media with an alpha ($\alpha$) of at least 15.

As a further subsidiary discovery, it was found that the media of the invention provided pleatability as good as the conventional borosilicate glass fiber media, described above, which is the standard in the art, but with substantially improved filtration performance.

It was also found that with the filter media described above, a filter can be constructed of that media where the side of the filter media having the wet laid layer first contacts a gas stream to be filtered. By having the present wet laid media first contact the gas stream, the more coarse (open) and generally thicker wet laid media of the invention intercepts and removes large particle size solids from the gas stream. Further, the present wet laid layer loads in depth i.e., particles go into and attach to the filter rather than attach just on the face thereof. Typically, in such an arrangement, the present wet laid layer collects in depth solids having particle sizes greater than about 10 microns, and the electrically charged air laid layer (which is downstream of the wet laid layer in the gas stream) collects somewhat in depth solids having a particle size less than about 10 microns. By this arrangement, substantial dust holding capacity (DHC) values, e.g., greater than 15 grams per square meter of media area can be achieved even with a pleatable filter.

Accordingly, briefly stated, the present invention provides a pleatable, high-efficiency, non-woven gas filtration media. The media comprises an electrically charged air laid fibrous layer having a thickness of between about 2 mils(0.05 mm) and about 35 mils(0.89 mm); a wet laid fibrous layer having a thickness of between about 5 mils(0.27 mm) and about 35 mils; and wherein the combined layers have (a) a thickness of between about 10 mils(0.25 mm) and about 50 mils(1.27 mm), (b) a stiffness of between about 200 and about 3500 mgs, (c) a Frazier of between about 10 and about 400 CFM, and (d) an $\alpha$ of at least 15.

The invention also provides media in a pleated form, as well as a filter where the media is in a pleated form.

DETAILED DESCRIPTION OF THE INVENTION

Figure 1:
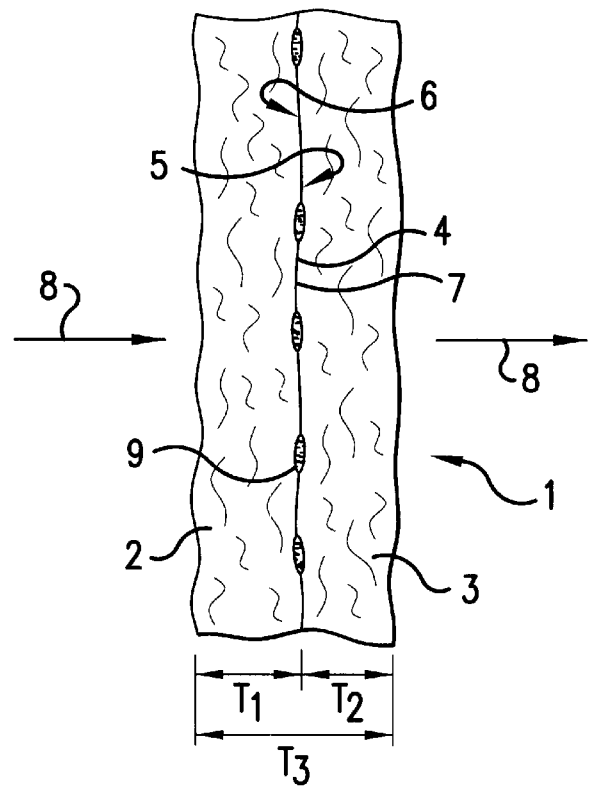
FIG. 1 is a highly idealized cross-sectional view of the filter media of the present invention.

As seen in FIG. 1, the filter media, generally 1 is composed of a wet laid layer 2, an air laid layer 3 and joined at their respective interfaces 5 and 6 to form a joint 7. The direction of gas flow through the filter media, generally 1, is shown by arrows 8. The two layers 2, 3 may be joined together by adhesives 9.

Figure 2:
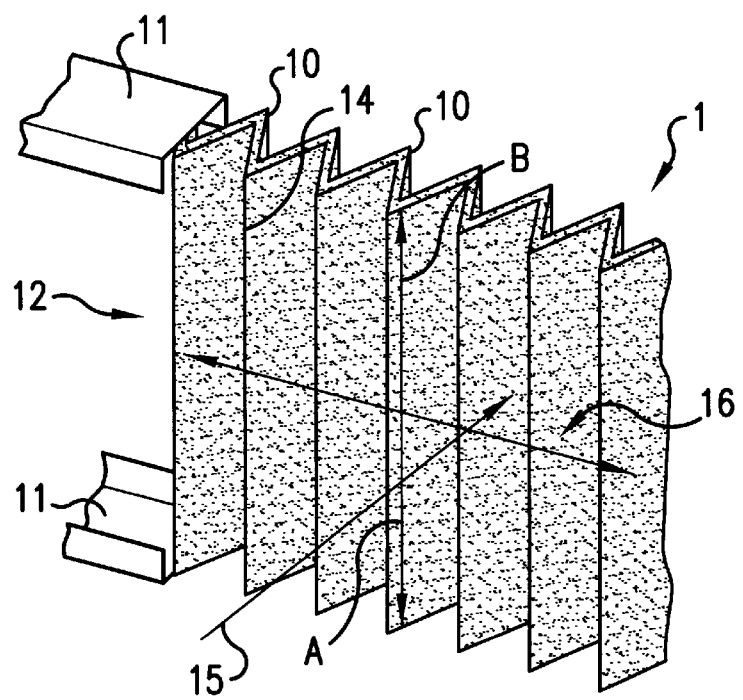
FIG. 2 is an idealized rendition of the filter material of the present invention being pleated in a filter frame to form a filter.

Filter media 1 can be formed into a pleated configuration having pleats 10 as shown in FIG. 2. That pleated configuration of the media 1 is held in a frame 11 which, therefore, forms a filter, generally 12.

It is noted from Figure that the surface area of the pleated filter media in FIG. 2 is much greater than the planar area of the filter 12 formed by frame 11, as shown by arrows A and B. Thus, for high efficiency filters, which must be constrained within a nominal filter area, the pleated filter media provides a much higher filter media surface area than would a flat filter media. Accordingly, pleating is exceedingly important in such filters and the ability to pleat the filter media is, likewise, of great importance.

Figure 3A:
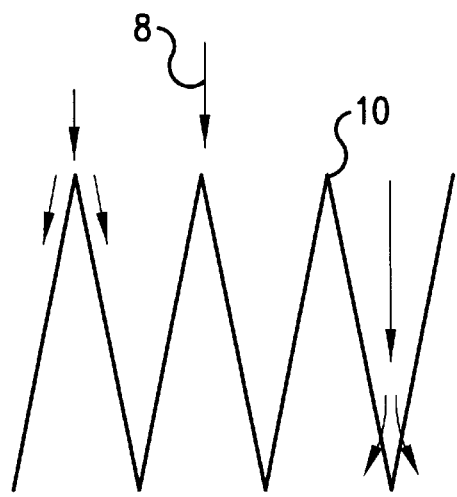
FIGS. 3A and 3B are idealized illustrations of air flow through filter media.
Figure 3B:
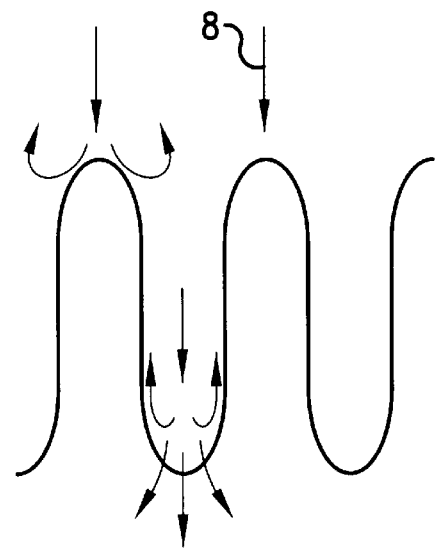
Figure 4A:
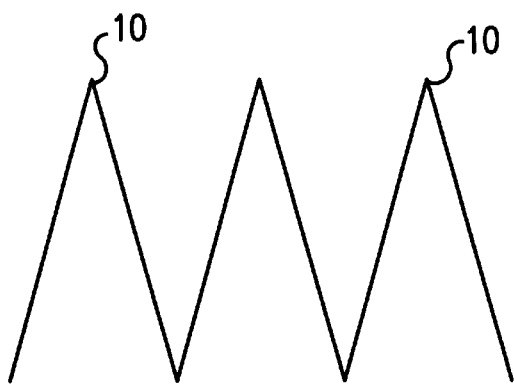
FIGS. 4A and 4B are idealized illustrations of what can occur when a filter media is not sufficiently stiff.
Figure 4B:
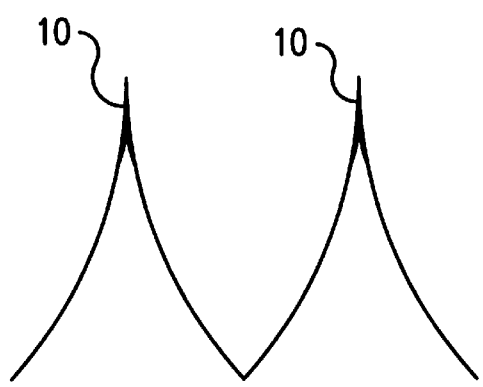

It will also be noted from FIGS. 2 and 3 that the pleats 10 are in the form of the most desirable angular pleats, i.e., have a sharp leading edge 14. Such a sharp leading edge 14, as opposed to a rounded edge, substantially reduces turbulence of an air stream 15 striking the media face, generally 16. This is shown in idealized form in FIGS. 3A and 3B. Reduced turbulence substantially improves filtration performance. However, as can be easily appreciated, such sharp leading edge pleat (referred to as an angular pleat) places considerable pressure on the media near the sharp leading edge 14. If the filter media is not sufficiently strong and stiff, the filter media will collapse on itself near leading edge 14, as is illustrated by FIGS. 4A and 4B. This causes a blinding of the media near the leading edge and greatly decreases filtration performance.

Figure 5A:
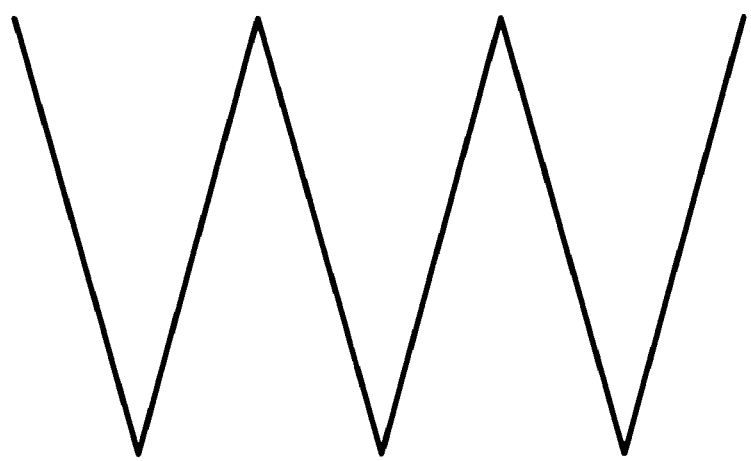
FIGS. 5A and 5B illustrate a proper angular pleat and one made of a media which is too thick.
Figure 5B:
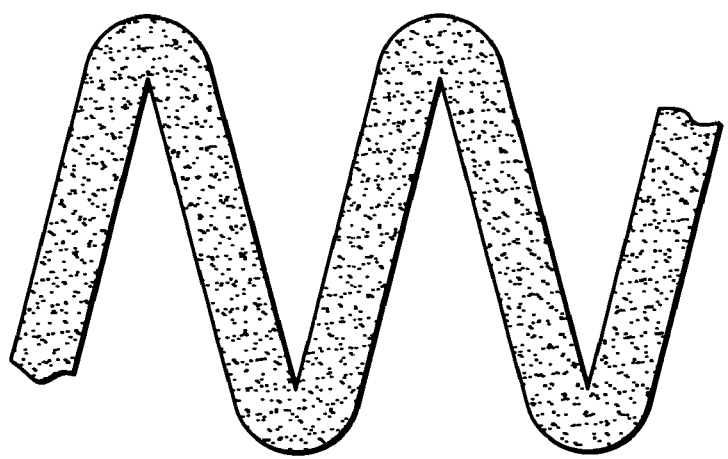

It will also be appreciated that with such sharp leading edge, the thickness of the media can be critical. Too great of thickness will prevent sharp edge 14 from being formed without blinding of that leading edge, as is shown in the comparison of FIGS. 5A and 5B.

Thus, for such angular pleating it is critical, according to the present invention, to have certain thicknesses and stiffnesses of the media.

In the filter media of the present invention, layers of the media may be collated and/or laminated to create the composite filter media that provides high efficiency. Furthermore, the mechanical filtration properties of the composite of the present invention are superior to the mechanical filtration properties of commonly utilized charged, air laid non-woven media.

In the present invention, at least one of the layers of the composite is an electrically charged air laid non-woven and at least one of the layers is a wet laid non-woven. The air laid layer may be charged prior to collating the composite. Referring more particularly to FIG. 1 in this regard, the incoming gas, e.g. air, will be laden with solid particulate matter which is to be removed by the filter formed from the media of FIG. 1. Typically, the present wet laid layer 2 will be sufficiently porous (higher permeability) that the wet laid layer can only trap and retain particles of about 10 microns or greater. However, since the wet laid layer 2 has a thickness T1, that wet laid layer will trap and retain, in depth, i.e. through the thickness T1, particles having average particle size of about 10 microns or greater. Thus, the present wet laid layer 2 will trap and retain a large amount of large particles.

The gas stream, after passing through the wet laid layer 2, will encounter an interface 7 and the air laid layer 3. That air laid layer 3 is, as noted above, electrically charged, and it will pick up and retain solid particles of sizes less than 10 microns. While, generally speaking, this thickness T2 of the air laid layer is less than the thickness T1 of the wet laid layer, nevertheless, some in depth loading of those particles of less than 10 microns in size can be achieved with the present air laid layer 3. If the wet laid layer 2 were not loading, then larger particle sizes, i.e., 10 microns and greater, would also be removed by the electrically charged air laid layer 3. However, since air laid layer 3 is generally of a fairly thin thickness, that air laid layer 3 would quickly load both in depth and on its face, such that the filter would begin to clog and the pressure drop across the filter would become quite high. Thus, using the present wet laid layer as both a support for the relatively weak air laid layer 2, and as a pre-filter of the air laid 2, substantial increases in filtration performance can be achieved by the present media.

Even further, the charge of an electrically charged layer slowly dissipates. As the charge dissipates, the ability to trap and retain particles likewise decreases. However, in the present filter media, the wet laid layer, acting both as a support and filtration media, works to compensate for the dissipation of the electrical charge in air laid layer 3 by trapping larger particles and thus saving air laid layer 3 from having to contain those particles and be discharged, somewhat, thereby.

Further, with the composite of the present invention, another advantage is provided. As noted above, in conventional air laid high-efficiency media, the media is not sufficiently stiff to maintain the pleated configuration in a filter frame. Therefore, as noted above, supports such as scrim, expanded metal and the like are used to provide sufficient strength to the composite to allow pleating thereof. However, those scrims and the like only add weight to the filter media without improving or enhancing the filtration efficiency of the media. That is not true with the present invention, as explained above, in that the wet laid material provides sufficient stiffness, and at the same time, contributes significantly to filtration performance of the composite.

The layers of the composite may be consolidated by any usual conventional means including, but not limited to, adhesive bonding, needle-punching, thermal point bonding, and ultrasonic spot welding. There are several approaches to attaching the charged air laid media layer to the wet laid layer. The two layers may be laminated together with adhesives or the like. However, care must be taken to control adhesive coverage since substantial blinding of the combined media, i.e., substantial increase in the pressure drop across the media, can occur. Thus, the adhesive should be placed in discrete spots, e.g., by a known adhesive spraying process or printing of the adhesive, and the adhesive should not be allowed to spread. Needling the charged media and the air laid web may also be done. However, care should be exercised in this process so that the needling does not disrupt the surface and filtration performance of the media. Finally, ultrasonic bonding may also be used to form a unitary filter media in accordance with the present invention.

The electrically charged air laid fibrous layer, as noted above, has a thickness of between about 2 and about 35 mils, although the thickness of between about 10 mils(0.25 mm) and 25 mils(0.64 mm) is preferred. The wet laid fibrous layer has a thickness of between about 5 mils(0.127 mm) and about 35 mils, as noted above, and thicknesses of between about 15 mils(0.38 mm) and 30 mils(0.76 mm) are preferred. The combined layers have a thickness of between about 10 and about 50 mils, as noted above, but that preferred combined thickness is between about 20 mils(0.51 mm) and about 45 mils(1.14 mm). The combined thickness ranges, as noted above, and the media described above can be formed into a very adequate pleated filter media.

Preferably, the air laid layer has fibers which are substantially hydrophobic, e.g., polyolefin fibers, such as polyethylene and polypropylene. Also, preferably, the air laid fibers are at least in part continuous fibers, i.e., fibers formed from continuous extrusion of a molten fiber material from conventional spinnerets in a meltblown molding operation.

The wet laid layer has wet laid fibers of about ⅛ inch(0.32 cm) to about 1.5 inches(3.8 cm) in length, and diameters of between about 0.5 deniers to about 12 deniers. The wet laid fibers can be composed of almost any fiber which can be wet laid but, typically, the wet laid fibers are composed of one or more of synthetic fibers, glass fibers, cellulosic fibers, rayon fibers, and natural fibers. The wet laid layer may contain a binder to improve the structural properties of the wet laid layer, or to adjust the stiffness of the wet laid layer. Typically, the binder is a latex binder, and usually the latex binder is an acrylic latex binder.

The properties of the wet laid layer can be adjusted by means other than the binder, such as the use of cellulosic fibers therein, and up to 50% soft wood fibers may be used in this regard. The cellulosic fibers, especially soft wood fibers, provide substantial flexibility and strength to the wet laid layer. That strength can also be improved by including some inorganic fibers, especially glass fibers, in the wet laid layer.

The amount of addition of these other fibers to build these specific properties will depend upon the properties being sought. For example, with higher thicknesses of the wet laid layer, the wet laid layer will give very substantial support to the air laid layer, and will provide the necessary stiffness for acceptable pleating. On the other hand, if a fairly thin wet laid layer is used, then it may be desirable to improve the properties thereof by the addition of cellulosic fibers, e.g. soft wood fibers, and or the use of glass fibers and/or binders.

It is also possible to use more than two layers, e.g. at least two or three layers of the air laid layers and/or at least two or three layers of the wet laid layer. This is especially true when very thin layers are produced for each of the two layers, especially when the equipment available for such production cannot produce very thick layers.

As noted above, the filter produced, as shown in FIG. 2, is such that the side of the filter media having the wet laid layer first contacts the gas stream. Thus, the wet laid layer collects in depth particles having a size greater than about 10 microns and the electrically charged air laid layer collects in depth particles of less than about 10 microns. With this arrangement, the filter can have dust holding capacity at least as good as prior art filter media, i.e., microglass filter media.

The electrically charged air laid media is caused to be charged in the conventional manner, i.e. a corona discharge, the details of which are well known in the art and will not be repeated herein.

The air laid material is preferably produced in a conventional meltblown apparatus with conventional spinnerets and converging airstream at those spinnerets to produce substantial continuous fibers which are, as is conventional, collected on a moving belt to provide an air laid material. The production of such air laid material by such meltblown technique is well known in the art and will not be repeated herein for conciseness.

The wet laid layer is more difficult to make, although it can be made on any of the usual papermaking machines. However, a delta-former is a most preferred machine, since that machine is capable of producing significantly thick layers of the wet laid fibers with a fairly concentrated dispersion thereof and produce a uniform layer. When using a delta-former machine, the dispersion of the fibers to be wet laid and to be passed to the delta-former, can be up to 1% by weight. The speeds of the delta-former may vary between about 15 and 330 feet per minute and still make an acceptable wet laid layer for the present invention.

The invention will now be illustrated by the following example, where all parts and percentages are by weight, unless otherwise specified, which is also the same in the foregoing disclosure and following claims.

EXAMPLE

The following tests were conducted on the non-woven layers of this example and the results are set forth in Table 1.

(e) Frazier: T.A.P.P.I., "Air Permeability of Porous Paper, Fabrics and Pulp Handsheets," T-251, reported in cubic feet per minute (CFM). Used a Frazier Air Permeability Test.

(f) Dust Holding Capacity (DHC): Add-ons of media challenged out a standard dust having particle sizes from 0.3 microns to 10 microns (ASHRA test dust).

$$Alpha: \alpha = \frac{[-LOG(Penetration/100)] \times 100}{\Delta P(\text{Resistance})} \quad (g)$$

As shown in Table I, six fabrics were prepared, i.e., two wet laid fabrics, two air laid fabrics and two composite fabrics. Fabric 1 was 90% polyester fabric of fibers between about 1½ to 6 deniers, average, and about ¼ inch(0.64 cm) to ½ inch(1.27 cm), in length, average, with 10% vinyl acetate binder. Fabric 2 was composed of 60% polyester fibers (28% 1.5 deniers, 0.5 inch length; 28% 1.5 deniers, 0.25 inch-0.64 cm-length), and ¼ to ½ inch in length average, 20% vinyl acetate binder and 20% hardwood pulp fibers. Fabrics 3 and 4, the air laid layers, were made of 100% meltblown polypropylene essentially continuous fibers of about 1.5 to 8 microns in average diameter. Fabric 5 was a composite of fabrics 1 and 3, and fabric 6 was a composite of fabrics 2 and 4. Composite 5 was made by adhesive lamination using a conventional adhesive sprayer. Fabric 6 was laminated by printing adhesive with a spot print roll.

TABLE 1

| | | WET LAID LAYER | | AIR LAID LAYER | | COMPOSITE | |
|---|---|---|---|---|---|---|---|
| FABRIC NO. | | 1 | 2 | 3 | 4 | 5 | 6 |
| GRADE DESIGNATION | | 5104 BX | 5160-25 | MB1031 | MB1030 | 18-500 | 17-500 |
| B.W. | (gsm) | 66 | 81 | 10 | 20 | 75 | 111 |
| Caliper | 8 psi | 16 mils | 18 mils | 4.0 mils | 6.3 mils | 20 mils | 20 mils |
| (mils) | 4 psf | 19 mils | 19 mils | 8.4 mils | 14 mils | 21.5 mils | 24 mils |
| Stiffness (mgs) | MD | 370 | 920 | N/A | N/A | 400 | 720 |
| NaCl | % Pen | 88 | 89 | 44.5 | 14.4 | 41.0 | 10.2 |
| | Resist (mm) | 0.1 | 1.0 | 0.5 | 1.6 | .7 | 4.5 |
| Alpha | | | | | | 55.3 | 22.0 |
| Frazier | (CFM) | 825 | 160 | 307 | 100 | 217.7 | 35.8 |
| DHC | grams | — | 26 | — | — | 48.0 | 23 |

(a) B.W. (Basin Weight): T.A.P.P.I. procedure, reported in grams per square meter (gms), T-410, "Basin Weight of Paper and Paperboard Used a Molten Basis Weight Scale, Model PE 6000.

(b) Caliper (Thickness): T.A.P.P.I. procedure, T-411, "Thickness (Caliper) of Paper and Paperboard," at 8 pounds per square inch and 4 pounds per square inch, reported in mils. Used a T.M.I. Series 400 automatic Micrometer, Model 49–62 for the 8 psi and an Enco Gague No. 605–4070 with base 653 having a modified 4 inch×4 inch plate for the 4 psi.

(c) Stiffness: T.A.P.P.I. Stiffness of Paper Procedure, T-543, reported in milligrams. Used a Genley Model No. 4171-D Automatic Digital Stiffness Tester.

(d) Salt Penetration: A.S.T.M. "Evaluation of Air Assay Media," D2 986–91, reported in percent penetration. Used a TSI Model 8130 Automatic Filter Tester.

The air laid fabrics 3 and 4 were made on a conventional meltblown apparatus. The wet laid fabrics 1 and 2 were made on a Delta-former using a dispersion of fibers of less than 1%.

As can be seen from Table 1, the stiffness of the composite fabrics 5 and 6 fits quite well into the required range of 200–3500 mgs. The thickness of the two composites to achieve that stiffness was well within the required range of 10 to 50 mils and since the composite thickness was at the lower end of that range, i.e., 20 mils(0.51 mm) at 8 psi(562.5 g/sq. cm), the Frazier was exceptionally high for composite fabric 5 and quite acceptable for composite fabric 6, i.e., 217.7 and 35.8 CFM, respectively. With that stiffness, the composite fabrics are easily angularly pleated and give quite acceptable and exceptional permeability (Fraziers). The higher permeability of fabric 5 gave greater penetration of NaCl, as would be expected. The α for both fabrics 5 and 6 are greater than 15, with the α of fabric 5 being 55.3 and the α of fabric 6 being 22.0. These are exceptionally high α values. As a comparison, filter media produced from microglass fibers, typically have an alpha of less than 15.

In addition, a Minimum Efficiency Rating Value (MERV) was determined by the procedure of an ASHRAE 52.2 test at 10 cm/sec media velocity. Fabric 5 has a MERV of 11 and fabric 6 has a MERV of 15. These are exceptional Minimum Efficiency Rating Values when compared to current media, as shown in Table 2.

As noted above, the present filtration media can be pleated as well as the prior art standard microglass filtration media but the present media provides improved filtration performance. In Table 2, below, filtration performance for a prior art microglass media and the present media are compared and discussed in detail below.

Before considering Table 2, it is important to understand that pleating is most desired. A typical framed filter of 2 ft. (0.61 m) by 2 ft. (4 sq. ft.-0.37 sq. m-) will have a high efficiency pleated surface area of 75 to 200 sq. ft.(6.97 to 18.6 sq. m) with up to 8 pleats per linear inch, e.g., 3 or 4 to 8 pleats. As opposed to a flat filtration media of 2 ft. by 2 ft., which will have a MERV (Minimum Efficiency Rating Value) of about 8 or less, the present pleated filter media will have a MERV of at least 10 and up to 16 or more. Pleat heights are typically 1 to 4 inches(2.54 to 10.2 cm), but can be as little as ½ inch up to as much as 10 inches(1.27 to 25.4 cm).

As noted above, microglass filter media is the standard for pleated high efficiency filters, i.e., HEPA, ULPA and ASHRAE filter media. Two of the most widely used ASHRA standard media are the "60% Dual Layer Microglass" and the "90% Dual Layer Microglass". The percent refers to the typical performance of a filter media utilizing this media according to the ASHRAE 52.2 test standard. These standard media are widely used in pleated form. Table 2 compares these two media with Fabric Numbers 5 and 6 of Table 1.

TABLE 2

ASHRA MICROGLASS MEDIA AND THE MEDIA OF THE INVENTION

| MEDIA | NaCl Performance % Pen. Resist. (mm) | CFM | DHC | Initial 52.2 EFFIC.* (MERV) |
|---|---|---|---|---|
| 60% Dual Layer Microglass | 80 | .9 | 175 | 40 | 10 |
| FABRIC 5 | 41 | .7 | 217 | 48 | 11 |
| 90% Dual layer Microglass | 27 | 6.5 | 27 | 24 | 14 |
| FABRIC 6 | 10.2 | 4.5 | 36 | 23 | 15 |

*-ASHRAE 52.2 Test at 10 cm/sec media air velocity

As can be seen from Table 2, when comparing similar Dust Holding Capacity media, i.e., "60%" vs. FABRIC 5 and "90%" vs. FABRIC 6, the present media have substantially better NaCl performance, resistance, CFM and MERV.

It can therefore be seen that the present invention provides a very substantial advance in the art and the invention is intended to be embraced by the spirit and scope of the following claims.

What is claimed is:

1. A pleatable high efficiency non-woven, gas filtration media, comprising:

(1) an electrically charged air laid fibrous layer having a thickness between about 2 and about 35 mils;

(2) a wet laid fibrous layer having a thickness of between about 5 and about 35 mils; and wherein the combined layers have, (a) a thickness of between about 10 and about 50 mils, (b) a stiffness of between about 200 and about 3500 mgs, (c) a Frazier of between about 10 and about 400 CFM, and (d) an α of at least 15.

2. The media of claim 1, wherein the air laid layer has fibers which are substantially hydrophobic.

3. The media of claim 2, wherein the hydrophobic fibers are polyolefin fibers.

4. The media of claim 1, wherein the air laid fibers are at least in part continuous fibers.

5. The media of claim 1, wherein the wet laid layer has fibers of lengths of about ⅛ inch to about 1½ inch.

6. The media of claim 5, wherein the wet laid fibers have diameters of between about ½ to about 12 deniers.

7. The media of claim 6, where the wet laid fibers are up to 50% soft wood fibers.

8. The media of claim 6, wherein the wet laid fibers contain glass fibers.

9. The media of claim 1, wherein the layers are combined together by one or more of adhesive bonding, needle punching, thermal point bonding and ultrasonic spot welding.

10. The media of claim 1, where there are at least two layers of the air laid layer and/or the wet laid layer.

11. The media of claim 1, wherein the wet laid layer has wet laid fibers composed of one or more of synthetic fibers, glass fibers, cellulosic fibers, rayon fibers, and natural fibers.

12. The media of claim 1, where the wet laid layer contains a binder.

13. The media of claim 12, wherein the binder is a latex binder.

14. The media of claim 13, wherein the latex binder is an acrylic latex binder.

15. The media of claim 1, wherein the air laid layer has fibers of a diameter less than 5 microns.

16. The media of claim 1, wherein the thickness of the air laid layer is between about 10 and about 25 mils.

17. The media of claim 1, wherein the thickness of the wet laid layer is between about 15 and about 30 mils.

18. The media of claim 1, wherein the combined layers have a thickness of between about 20 and about 45 mils.

19. The media of claim 1, in a pleated form.

20. A filter having a filter media according to claim 1, wherein the side of the filter media having the wet laid layer first contacts a gas stream to be filtered.

21. The filter of claim 20, wherein the wet laid layer collects in depth particles having a size greater than about 10 microns and the electrically charged air laid layer collects in depth particles less than about 10 microns.

22. The filter of claim 20, wherein the filter media is in the form of a pleated media.

* * * * *